United States Patent [19]
Hipp

[11] Patent Number: 5,519,889
[45] Date of Patent: May 21, 1996

[54] METHOD AND APPARATUS TO CONCEAL RF INTERFERENCE IN AM RADIO RECEPTION CAUSED BY A SWITCH MODE POWER SUPPLY

[75] Inventor: Kenneth M. Hipp, Novi, Mich.

[73] Assignee: Ford Motor Company, Dearborn, Mich.

[21] Appl. No.: 191,909

[22] Filed: Feb. 4, 1994

[51] Int. Cl.⁶ .................................................. H04B 1/16
[52] U.S. Cl. ........................... 455/297; 455/298; 455/343; 363/21; 363/41
[58] Field of Search ................................. 455/298, 38.3, 455/127, 297, 343; 363/21, 41, 98

[56] References Cited

U.S. PATENT DOCUMENTS

| 3,818,128 | 6/1974 | Chambers et al. | |
|---|---|---|---|
| 3,967,181 | 6/1976 | Chambers et al. | |
| 4,189,732 | 2/1980 | Atwater | 343/5 R |
| 4,292,671 | 9/1981 | Evans et al. | 364/433 |
| 4,403,350 | 9/1983 | Imai et al. | 455/297 |
| 4,551,856 | 11/1985 | Victor et al. | 455/183 |
| 4,647,823 | 3/1987 | Luz | 315/411 |
| 4,814,770 | 3/1989 | Reger | 455/127 X |
| 4,879,758 | 11/1989 | DeLuca et al. | 455/296 |
| 5,014,178 | 5/1991 | Balakrishnan | 363/21 X |
| 5,103,321 | 4/1992 | Amachi et al. | 358/475 |
| 5,117,290 | 5/1992 | Heerkens | 358/158 |
| 5,170,333 | 12/1992 | Niwayama | 363/21 |
| 5,175,441 | 12/1992 | den Hollander | 455/343 X |
| 5,274,338 | 12/1993 | Rieger et al. | 455/214 X |
| 5,327,333 | 7/1994 | Boycan et al. | 363/21 |
| 5,363,323 | 11/1994 | Lange | 363/21 |

Primary Examiner—Edward F. Urban
Attorney, Agent, or Firm—Kevin G. Mierzwa; Roger L. May

[57] ABSTRACT

A method and apparatus is disclosed in which a transformer which has at least one DC output and one input, and a precision timer which generates a control signal having a frequency within a predetermined range of an integer multiple of the carrier frequency spacing. A switch which is connected to the transformer controls the input of the transformer. A controller which is electrically connected to said DC output, said precision timer and the switch pulse width modulates said switch means at an integer multiple of the carrier frequency spacing whereby the DC output of the transformer is regulated.

6 Claims, 2 Drawing Sheets

METHOD AND APPARATUS TO CONCEAL RF INTERFERENCE IN AM RADIO RECEPTION CAUSED BY A SWITCH MODE POWER SUPPLY

BACKGROUND OF THE INVENTION

The invention relates generally to a switch mode power supply and more specifically to preventing the RF noise generated from a switch mode power supply from interfering with the reception of a radio signal in a nearby radio receiver.

The operation of a switch mode power supply generates noise impulses at frequencies which extend into the frequencies of AM broadcast frequencies. When the noise signal is received by a radio receiver, the noise signal typically demodulates into an undesirable tone in the audible range of a human ear (20 Hz–22 KHz). One method to reduce the received noise is to locate the radio receiver away from the noise source. However, in automotive applications and, more specifically, in an automobile instrument panel, the distance a radio receiver can be separated from a switch mode power supply utilized in the instrument panel is limited.

In prior art applications, the operating frequency of a switch mode power supply is controlled by timing circuits such as RC circuits. The operating frequency of such circuits tend to drift over the temperature range typically encountered in automobiles. Thus, a time variable RF noise component may be picked up by an AM receiver.

It is therefore desirable to provide a switch mode power supply operating in close proximity to a radio receiver without producing substantial audible noise in the demodulated output of the radio receiver.

SUMMARY OF THE INVENTION

An advantage of the present invention is that a switching power supply can be placed in close proximity to an AM radio without generating noise on the demodulated signal.

The present invention includes a transformer which has at least one DC output and one input, and a precision timer which generates a control signal having a frequency within a predetermined range of an integer multiple of the carrier frequency spacing. A switch which is connected to the transformer controls the input of the transformer. A controller which is electrically connected to said DC output, said precision timer and the switch pulse width modulates said switch means at an integer multiple of the carrier frequency spacing whereby the DC output of the transformer is regulated.

DETAILED DESCRIPTION OF THE PREFERRED EMBODIMENT

Figure 1:
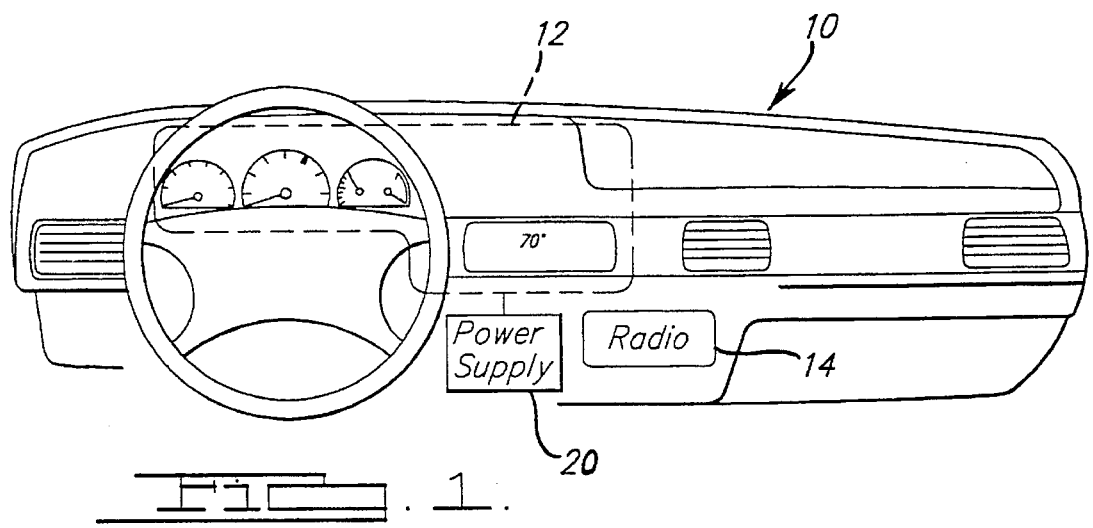
FIG. 1 is an instrument panel of an automobile.

Referring to FIG. 1, an instrument panel 10 in an automotive vehicle typically has several components including an instrument cluster 12 and radio receiver 14. A power supply 20, which is preferably a pulse width modulated switch mode power supply, powers instrument cluster 12. The switch mode power supply can be of the boost regulator type (e.g., flyback) or buck type. Radio receiver 14 has an AM band which has carrier frequency assignment spacings of 10 KHz in the North America and 9 KHz in Europe. Because of its switching characteristics, power supply 20 typically generates RF noise that potentially interferes with AM reception in radio receiver 14.

Figure 2:
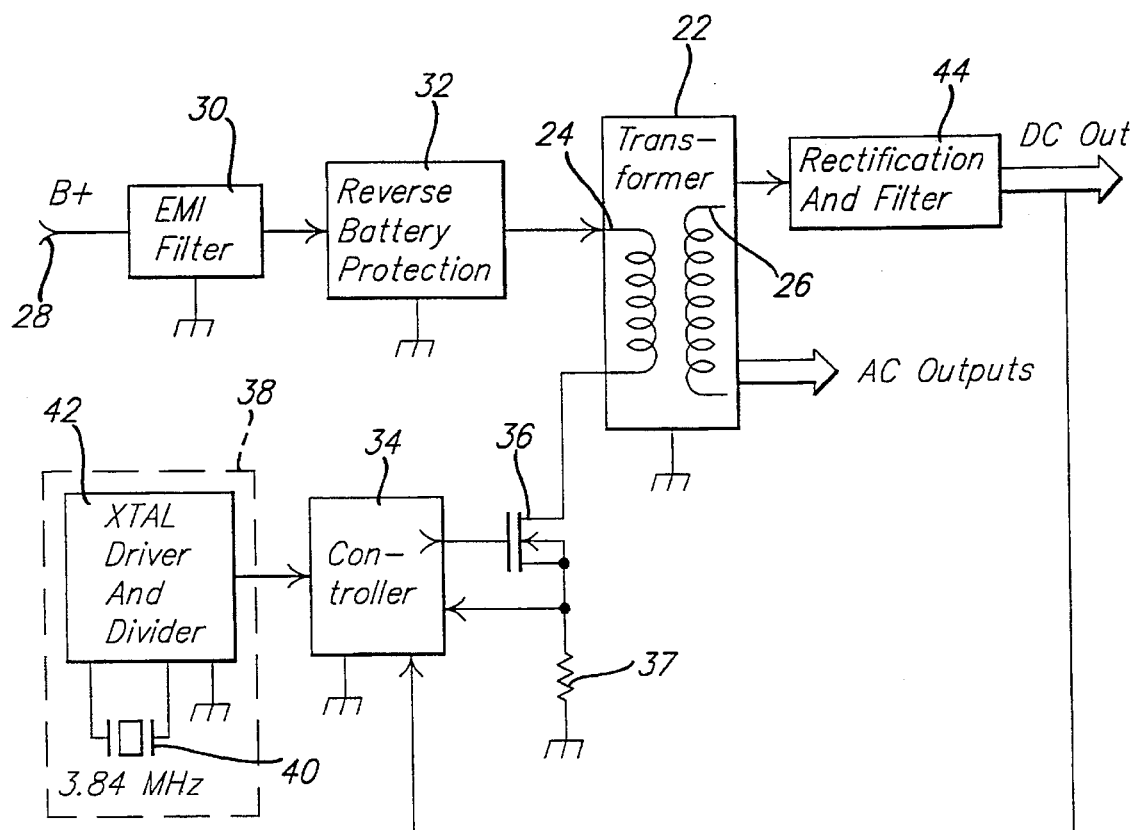
FIG. 2 is a block diagram of a preferred embodiment of the present invention.

Referring now to FIG. 2, a detailed block diagram of a switch mode power supply 20 is shown. Power supply 20 has a transformer 22 with a primary winding 24 and a secondary winding 26. A battery input 28 is connected to primary winding 24 through a series combination of an electromagnetic interference filter 30 and a reverse battery protection circuit 32, both of which are well known in the art of power supplies. Electromagnetic interference filter 30 filters electrical noise from travelling from the battery input 28 into primary winding 24 and vice versa. Reverse battery protection 32 prevents damage to the electrical system if the battery connections are connected incorrectly.

The other side of primary winding 24 is connected to ground through a switching device 36, (for example, a transistor such as a JFET) and a resistor 37. A controller 34 is connected to the gate terminal of JFET 36 to pulse width modulate the current through primary winding 24 and thereby control the voltage across the output of secondary winding 26. Thus, controller 34 operates switch 36 at a predetermined operating frequency at a variable pulse width determined in response to feedback of the output voltage of secondary 26. The operating frequency of controller 34 is controlled by a precision timer 38 which is electrically connected to controller 34.

Timer 38 preferably consisting of a crystal 40 and divider circuit 42 is used to generate a control signal. Crystal 40 can be any precision crystal having a desired operating frequency and accuracy. For example, a crystal having 3.84 MHz operating frequency has been successfully used. The frequency of control signal is an integer multiple of 9 KHz or 10 KHz depending on whether the circuit is going to be used in Europe or in North America, respectively. For example, a divider circuit 42 can be used to divide the frequency of the 3.84 MHz crystal by 128 to obtain an output frequency of 30 KHz.

Secondary winding 26 has a series of DC outputs which are connected to rectification and filter circuitry 44 in order to provide a clean DC voltage. The output of secondary winding 26 provides feedback for controller 34 so that controller 34 maintains the desired output voltage. For example, if the feedback voltage drops below a predetermined level, the pulse width is increased by said controller 34. If said feedback rises above a predetermined level, then said controller 34 decreases said pulse width.

Figure 3:
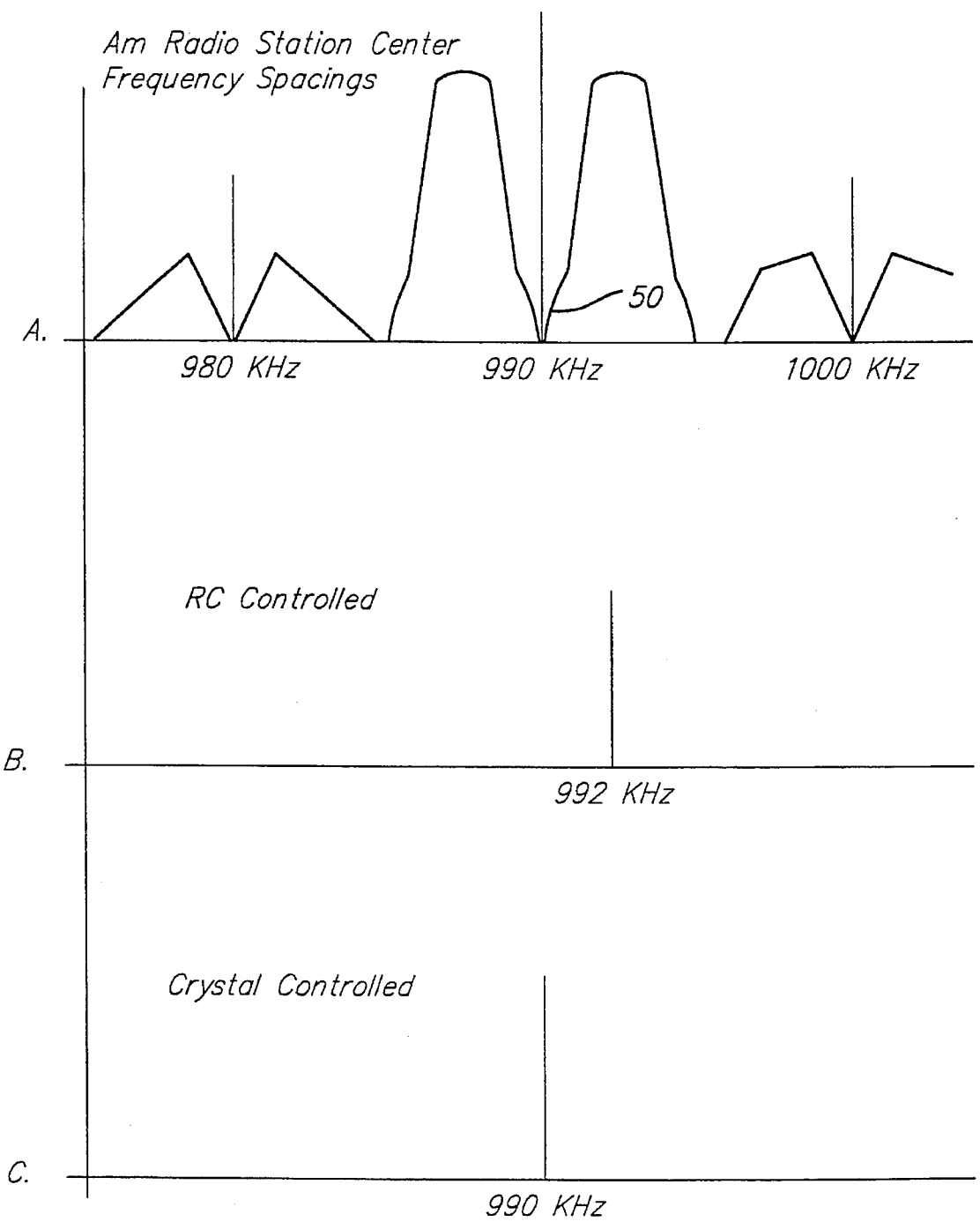
FIG. 3A is a plot of a portion of carrier frequency spacings.
FIG. 3B is a plot showing harmonic RF emission from a prior art RC-controlled power supply.
FIG. 3C is a plot showing harmonic RF emission from the crystal controlled power supply of the invention.

Referring now to FIG. 3A, the AM radio frequency band spacing in North America is 10 KHz, a portion of which is shown with information signal 50. FIG. 3B shows a typical RC controlled power supply impulse which switches at 32 KHz. The 31st harmonic, 992 KHz, is within the AM band. FIG. 3C shows a power supply impulse provided from a power supply controlled by a precision timer of the present invention.

In operation, switch 36 radiates an RF signal in the form of power impulses at the fundamental operating frequency and its associated harmonic frequencies which typically extend into the AM band and thus when demodulated possibly causing noise in the audible range of the human ear. When an AM signal is demodulated, an information signal within 20 Hz of the center frequency will be demodulated into a range below the audible range of the human ear. In the prior art when an RC timing circuit is used, an extremely accurate switching time through a broad range of operating temperatures is not possible. The impulse as shown in FIG. 3B is 2000 Hz from the center frequency and will demodulate into an audible tone. However, when a crystal 40 is used for controlling such circuit, the accuracy can be easily controlled within 20 Hz of the center frequency at various operating temperatures experienced by automotive vehicles so that an RF noise generated by the power supply is demodulated to a frequency below the audible range.

What is claimed is:

1. A switch mode power supply for use near a radio receiver for receiving radio broadcasts transmitted at carrier frequencies spaced according to a predetermined carrier frequency spacing, comprising:

a transformer having at least one DC output and one input;

precision timing means for generating a control signal having a frequency within a predetermined range of an integer multiple of said carrier frequency spacing;

switch means electrically connected to said transformer for controlling said input of said transformer; and controller means electrically connected to said DC output, said precision timing means and said switch means for pulse width modulating said switch means at an integer multiple of said carrier frequency spacing whereby said DC output of said transformer is regulated.

2. A switch mode power supply as recited in claim 1 wherein said precision time means comprises a crystal oscillating at a predetermined frequency.

3. A switch mode power supply as recited in claim 1 wherein said precision timing means further comprises a divider circuit for dividing said predetermined frequency to a lower predetermined frequency.

4. A switch mode power supply as recited in claim 1 wherein said predetermined range is 20 Hz.

5. A switch mode power supply as recited in claim 1 wherein said spacing is 10 KHz.

6. A switch mode power supply as recited in claim 1 wherein said spacing is 9 KHz.

* * * * *